INVENTOR.
THOMAS C. NEILSON

Nov. 16, 1965 T. C. NEILSON 3,217,474
MOTORIZED RAKE
Filed Jan. 14, 1963 2 Sheets-Sheet 2

INVENTOR.
THOMAS C. NEILSON
BY
Anderson, Spangler & Wymore
ATTORNEYS 3,217,474
MOTORIZED RAKE
Thomas C. Neilson, 615 Franklin St., Loveland, Colo.
Filed Jan. 14, 1963, Ser. No. 251,151
5 Claims. (Cl. 56—27)

This invention relates in general to raking devices and, more particularly, to motorized raking devices suitable for use on lawns.

It is, of course, well known that all dead grass and clippings after mowing should be removed from a lawn because their presence interferes with the growth of new grass resulting in a sparse lawn and increasing the tendency to winter-kill. Moreover, once the clippings become imbedded in a lawn, it is impractical to attempt their removal by hand-raking. Accordingly, the grass clippings should be either caught before they become a problem or else use some more efficient way of removing them. The motorized rake of the present invention relates to this purpose.

Various and diverse types of power-driven rakes are well known in the art. However, the prior art rakes are deficient in that they either fail to remove the dead grass from the lawn or else, in so doing, cause substantial damage to the remaining live blades. Another deficiency in the prior art rakes is that of tooth design since some are so stiff as to dig up the living grass during the process of removing the dead grass and cuttings while others tend to bend or break and thereby reduce the efficiency of the entire unit. Finally, many of the available power-drawn rakes are expensive, complicated and difficult to use.

Accordingly, the principal object of the invention is to provide a novel and improved motorized rake.

Another object of the invention is to provide unique teeth that are adapted to perform an efficient raking operation without damaging the living grass.

Still another objective is to provide a novel arrangement of mounting the teeth used for the raking operation.

An additional object is the provision of improved means for raising or lowering the device on which the teeth are mounted.

Other objects and a fuller understanding of the invention may be had by referring to the following description and claims taken in conjunction with the accompanying drawings in which:

Figure 1:
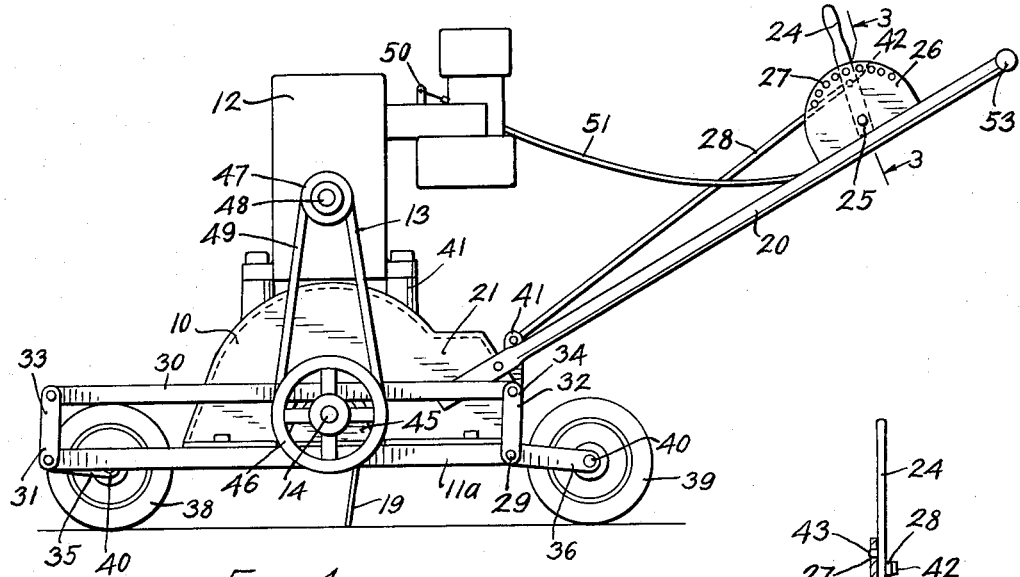
FIGURE 1 is a side elevation showing the belt device and hand-operated throttle control.
Figure 4:
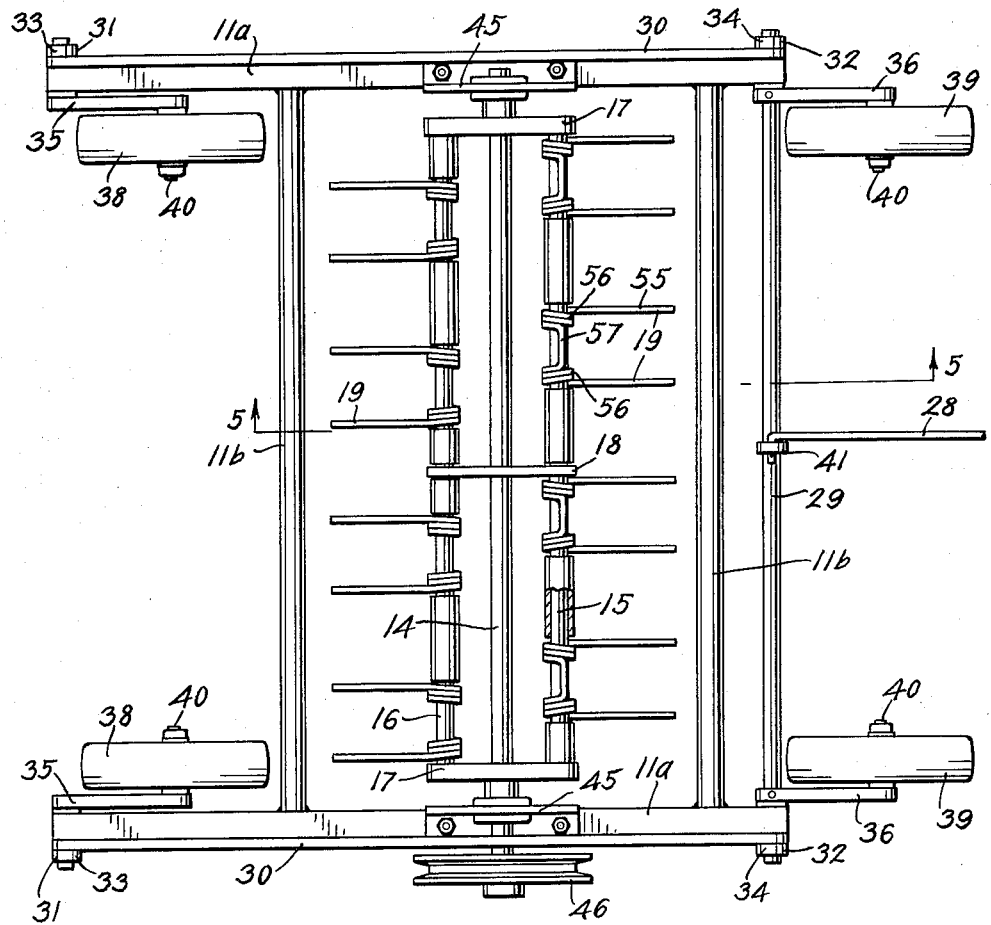
FIGURE 4 is a bottom plan view, portions of which have been broken away to better reveal the motorized rake of the instant invention; and, FIGURE 5 is a fragmentary longitudinal sectional view taken along line 5—5 of FIGURE 4.
Figure 5:
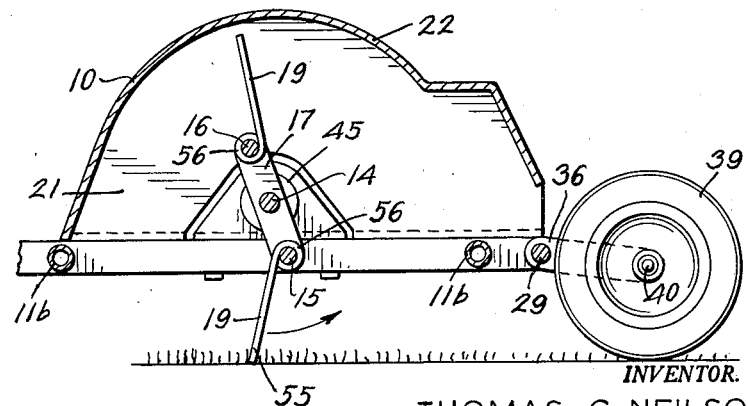

With reference to the drawings and in particular to FIGURE 1, the invention comprises a frame having parallel side members indicated as 11a and parallel front and rear members indicated as 11b in FIGURE 4 which are connected immovably at their ends to the parallel side frame members. Bolted to the side frame members 11a is a housing 10 upon which is mounted an engine 12 operatively connected by a belt and pulley drive assembly 13 to a rotatable primary transverse shaft 14 mounted on the frame 11a and connected at each end by the end plates 17 and at the middle by a center plate 18 to a pair of secondary transverse shafts 15 and 16 which carry the rake teeth 19. The two secondary shafts are positioned in a substantially parallel relationship to the primary transverse shaft and are mounted on the opposing respective inner faces of the end plates 17 and the center plate 18. Both secondary shafts are equidistant from the primary shaft since the end plates and the center plate are positioned on the primary shaft at their exact center. It will be noted that upon rotation of the primary shaft 14 the secondary shafts 15 and 16 being connected thereto by the end plates 17 and the center plate 18 are also rotated. The entire unit is guided and controlled by the handle 20 bolted to the housing. It is preferred that the housing 10 be a single metal casting fabricated from some relatively lightweight material such as aluminum; however, it could be formed from sheet metal if it is desirable to do so. The housing 10 includes a pair of vertical side plates 21 arranged in transversely spaced parallel relationship and interconnected along their upper margins by the cover plate 22. Located on the cover plate 22 are the engine mountings 41. As shown by FIGURES 1 and 5, the cover plate curves upwardly and rearwardly over the rotatable shafts and tooth assembly providing a cover plate 22 and sideplates 21 which define a housing 10 closed at the top and open on the bottom for the reception of the rotating primary shaft 14, and the pair of secondary shafts 15 and 16 which carry the teeth 19, the housing also being open at the rear end for the discharge of raked debris.

Figures 2, 3:
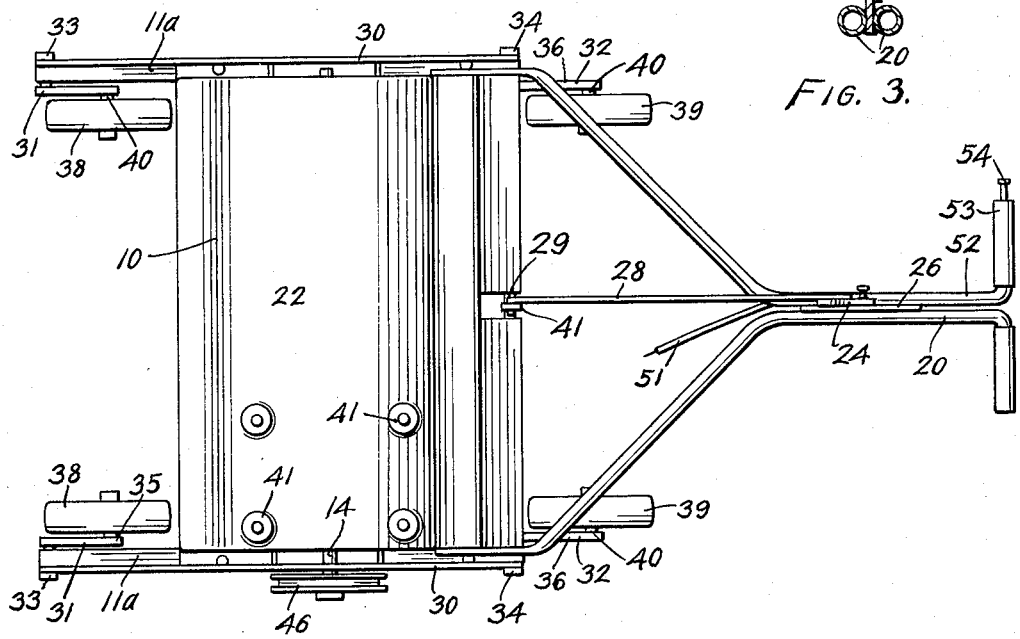
FIGURE 2 is a top plan view, the motor having been removed.
FIGURE 3 is a sectional view taken along the lines 3—3 of FIGURE 1.

Mountings 41 may be cast integrally with the housing on the cover plate thereof providing a support for the engine 12. The handle 20 is formed to provide a bifurcated front end portion (FIGURE 2), the extremities of which are bolted or otherwise attached to the sideplate adjacent the rear edges thereof.

For purposes of varying the depth of which the rake teeth 19 operate, there is attached to the handle 20 for control by the operator, a lever 24 pivotally connected to the handle at 25. The device 26 is connected to the handle 20 and contains the apertures 27 which provide various positions to which the lever 24 can be moved. The lever 24 is constructed to contain a projection 42 which is adapted to fit into any of the apertures 27 under the tension of the spring 44. A rod 28 is connected at one end to the lever 24 at the position 42 and at the other end to the rod 29 by means of the upright arm 41 attached to the center of the rod 29. The rod 29 is movably connected at each end of the rear end of each of the secondary frame structures 30. The aforesaid secondary frame structures 30 are paired and are located in substantial parallel relationship on each side of the unit and are positioned lateral to the sideplates 21 and above the primary frame members 11a to which they are pivotally connected by means of the pair of front cranks 31 and a pair of rear cranks 32. The cranks being formed formed from the horizontal crank arms 35 and 36 and are immovably mounted on the lower ends of both the vertical crank arms 33 and 34 respectively. Front and rear pairs of wheels 38 and 39, respectively, are rotatably mounted at the end of the horizontal crank arms by the stubshafts 40 enabling the unit to be rolled along the ground. Thus, it will be seen that the depth at which the teeth operate is varied by moving the lever 24 to any of the apertures 27 which in turn will move the rod 29 operatively connected to the lever by the cable 28. Movement of the rod 29 will thereby force the secondary frame structure 30 in a forward or backward movement since it is pivotally connected to the frame 11a by the cranks 31 and 32. The cranks in turn will swing the wheels mounted thereon either upward or downward to any desired level thereby adjusting the level at which the rake teeth will operate.

In FIGURES 4 and 5 it will be seen that a pair of shaft bearings 45 are bolted on the side frame members 11a in position to receive the shaft 14 which is journalled for rotation therebetween. One end of the shaft projects outwardly beyond the adjacent bearing 45 in position to receive pulley 46 that is mounted thereon. The platform 23 on which the engine 12 is mounted is located on one side of the longitudinal centerline of the housing so that the pulley 47 attached to the drive shaft 48 thereof is positioned immediately above pulley 46, belt 49 providing the operative driving connection therebetween. Thus, operation of the engine causes the driven shaft 14 to turn causing the two substantially parallel secondary shafts connected thereto to turn in the same direction to sweep the rake teeth along the ground so as to throw the debris out through the open rear end of the housing.

In FIGURE 1 it will be seen that the engine 12 is of the type having a throttle 50 adapted to control the speed thereof upon movement to and fro. Remote actuation of the throttle is accomplished by means of the Bowden cable 51 which is passed through one of the tubular legs 52 of the handle into position where it is easily accessible to the operator. In the particular embodiment illustrated herein, one end of the cable 51 is attached to the throttle while the other end emerges from the hand-grip 53 where a push button 54 is provided.

In describing the detailed description of the rake, attention is directed to FIGURE 4 where it is shown that the secondary transverse shafts 15 and 16 are machined so to have at spaced intervals alternate portions of large and small diameters. It will be noted that the raking teeth 19 are loosely mounted on the secondary transverse shafts 15 and 16 in the machined portion of small diameter and are spaced so as to have the teeth fingers or tines 55 located between the raking teeth tines or fingers mounted on the other secondary shaft. In this manner the grass is substantially raked clear in the first sweep of my invention thereover.

With particular reference to FIGURE 4 of the drawings, the teeth 19 are formed from a single spring wire bent to provide a pair of coiled portions 56 connected in fixed spaced relation by bight 57 and each terminating in an elongated finger or tine 55. It should be clearly noted that the coiled portions 56 and the bights 57 do not interconnect with equivalent structures of adjacent units. The coiled portions 56 are arranged as to be in transversely spaced axial alignment with one another and of a diameter to loosely receive the secondary shafts 15 and 16. Thus it is seen that upon rotation of the primary transverse shaft 14, the secondary transverse shafts 15 and 16 which contain the teeth 19 will also rotate since they are directly connected to the primary shaft by the end plates 16 and the center plate 17. The fingers or tines 55 being rotatively mounted on the secondary shafts will swing freely in the direction of the moving shafts due to the action of centrifugal force thereon. This arrangement provides for tines that can spring backward without bending, breaking or digging into the lawn.

While it has not been illustrated, a catcher of the type used with lawn mowers can easily be attached to the rear end of the frame in position to receive the raked clippings discharged therethrough. The more common practice is, however, to use the motorized rake of the instant invention for the purpose of digging out deeply imbedded clippings matted in a lawn and dispose them on the surface where they can easily be gathered up with a grass broom or similar article.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In a motorized rake having a frame, a primary transverse shaft and an open bottomed housing mounted on the frame, an engine supported on the housing connected to the shaft forming a driving connection therewith and a handle connected to the housing and frame, the improvements comprising a wheel supported mechanism pivotally mounted on the frame for adjusting the depth at which the rake will operate, and a pair of secondary transverse shafts operatively connected to the primary transverse shaft adapted to be rotated upon movement of the primary transverse shaft, each of said secondary shafts having a plurality of independent raking teeth freely rotatable and loosely mounted side-by-side thereon.

2. In a motorized rake having a frame, a primary transverse shaft and an open bottomed housing mounted on the frame, an engine supported on the housing connected to the shaft forming a driving connection therewith and a handle connected to the housing and frame, the improvements comprising in combination a lever mounted on the handle and controlled by the operataor, a transverse rod operatively connected to the lever and adapted to be actuated by a desired movement of the said lever, a pair of parallel secondary frame members each having the same end operatively connected to opposite ends of the said transverse rod, front and rear pairs of cranks for pivotally connecting each of said parallel secondary frame members to the frame in a lateral position relative to each side of the housing and above the frame thus upon actuation of the said transverse rod by the lever the said pair of secondary frame members and said cranks are moved to a desired position effecting a vertical variance at which the rake operates, front and rear pairs of wheels for providing a movable support for the cranks, a pair of secondary transverse shafts operatively connected to the said primary transverse shaft both of which are positioned substantially parallel to the said primary shaft and oppositely disposed relative to each other, each secondary shaft adapted to be rotated upon movement of the primary transverse shaft and a plurality of independent raking teeth loosely mounted side-by-side in a freely rotatable manner on each of said secondary shafts.

3. The improved motorized rake as set forth in claim 2 in which the freely rotating raking teeth are formed from a single length of spring wire bent to provide a pair of coiled portions connected in spaced relation by a bight with each coil terminating in an elongate ground engaging tine.

4. The improved motorized rake as set forth in claim 3 in which the coil portions of the teeth are of sufficient diameter to loosely receive the secondary shafts permitting free rotation of the teeth thereon.

5. The improved motorized rake as set forth in claim 2 including a pair of end plates centrally mounted at each end of the said primary transverse shaft and a center plate centrally mounted at substantially the middle of the said primary transverse shaft each of said end plates and said center plate being positioned substantially parallel to each other and having the said secondary transverse shafts mounted at their respective opposite ends thus positioning the said secondary transverse shafts in a parallel relationship to the primary transverse shaft.

References Cited by the Examiner

UNITED STATES PATENTS

| | | | |
|---|---|---|---|
| 207,010 | 8/1878 | Bullard | 56—372 |
| 2,848,859 | 8/1958 | Abel | 56—25.4 |
| 2,959,904 | 11/1960 | Ferris | 56—27 |
| 2,989,833 | 6/1961 | DeFino | 56—27 |
| 3,093,947 | 6/1963 | Whitman | 56—25.4 |

ANTONIO F. GUIDA, *Acting Primary Examiner.*

RUSSELL R. KINSEY, *Examiner.*